3,216,841
METAL SLIP CASTING COMPOSITION
Edward L. Thellmann, Walton Hills, Ohio, assignor to Clevite Corporation, a corporation of Ohio
No Drawing. Filed Apr. 30, 1962, Ser. No. 191,341
5 Claims. (Cl. 106—208)

This invention relates to a process for slip casting and to slip casting compositions employed therein.

In general slip casting is carried out by formulating a composition consisting of a suspending agent, a metal powder, and water. This composition or slip contains sufficient water to give the slip the proper consistency for casting. The slip is then poured into a plaster-of-paris mold of the desired shape. The mold is kept full for a short space of time depending upon its dryness, the proportion of water in the slip, and the thickness of the article to be formed. The mold absorbs water from the outer portions of the slip, thereby forming a deposit of the metal powder on the inside of the mold of a thickness which may be varied according to the length of time it is allowed to deposit. The cast article is then dried and later ignited in a non-oxidizing atmosphere whereby non-metallic additions are removed and the metal powder sintered to form a permanent article, the degree of sintering depending upon the temperature and duration of heating.

The term "suspending agent" may be defined as a material which has the ability to form a colloidal dispersion in water thereby preventing particulate material from settling out of the liquid phase. Typical suspending agents are agents such as for instance polyvinyl alcohol, gum arabic and various alginates.

Slip molding operations, however, are subject to certain deficiencies. It has been found for instance that it is difficult to control drying time in slip molding operations. Drying time, in turn, affects the reproducibility of the physical properties and dimensions of the article obtained. It has also been found that slip molded articles are sometimes difficult to remove from the molds, the molds themselves sometimes becoming discolored and unsuitable for additional molding operations.

It is, therefore, an object of this invention to provide a method for producing slip cast articles which have reproducibility of physical properties and dimensions.

It is another object of this invention to provide slip casting compositions having uniform drying times.

It is still another object of this invention to provide slip cast articles which are easily freed from molds without subsequent discoloration in the mold.

I have now discovered, in a slip casting process employing a mold and a slip casting composition consisting of a suspending agent and a metal powder carried in an aqueous medium, the novel steps of adding a salt to said slip casting composition and coating said mold with a hydroxide prior to casting. In general the salt to be employed is a water soluble salt which will exert an effect on the colloidal system of the suspending agent. The salts may be salts, such as for instance sodium chloride, potassium chloride and ammonium acetate. The preferred salt is ammonium acetate in that this salt is completely removed in sintering operations and does not have a corrosive effect on the metal article. The hydroxide employed may be any hydroxide which has the ability to prevent the metallic component of the slip from entering the face of the mold. Ammonium hydroxide has been found to be especially suitable for purposes of this invention. The salt should be present in the slip in amounts such that from 3% by weight to ½% by weight of the water weight of the slip is salt. In the preferred composition of this invention 1% of the water weight of the slip is salt. The hydroxide is preferably employed in the form of aqueous solutions containing about 29% by weight of hydroxide.

The improvements in slip molding compositions are the result of experimental efforts made to obtain faster drying time in slip molding compositions by altering the pH of the compositions. The pH of slip molding compositions was changed through the additions of acids and bases. However, the slip molding compositions which were found to be desirable invariably had no significant pH change, the result, of course, being due to the fact that acid and base additions were merely neutralizing each other and forming salts. While the presence of a salt rather than any critical pH has been found to be the deciding factor in effecting drying time of a slip, it should be noted that slips are preferably basic in nature in order to prevent the slip from destroying the mold.

In order to determine the extent to which salt effects the drying time of a slip the following test was made. A basic slip composition was prepared containing 75% by weight of 250 mesh iron powder plus 25% by weight of water and sufficient superloid (high viscosity ammonium alginate prepared by Kelco Co.) to act as a suspending agent. This basic slip composition was divided into three portions, with additions of ammonium acetate salt as follows: first slip—ammonium acetate salt present in quantities such as to compose 0.5% of the total water weight; second slip—ammonium acetate salt present in quantities such as to compose 1.0% of the total water weight; third slip—ammonium acetate salt present so as to compose 2.0% of the total water weight. All three slips were then poured into ring-shaped plaster molds. The ring containing 2.0% salt was dry enough to handle within one hour. The ring containing 1.0% salt was dry and firm enough to handle in four hours, while the ring containing 0.5% salt was dry after standing over night.

In general the slip compositions of this invention are prepared as follows:

The correct amount of de-ionized water is measured. From 0.75% to 1.0% of the water weight of salt is added and put into solution by means of agitation. Suspending agent is then added and the mixture agitated until the suspending agent is completely dissolved. Ammonium hydroxide is added until a pH of about 9 is obtained. The solution is then charged with metal powder, the mixing speed being reduced to eliminate air entrapment. The slip is de-aired on a jar mill at one r.p.m. for a period of from two to four hours. The slip is adjusted to a pH of 9.6 to 9.7 by addition of ammonium hydroxide solution.

The following specific examples of slip compositions are given for purposes of illustration and should not be considered as limiting the spirit or scope of this invention.

Example I

| | Parts |
|---|---|
| Iron carbonyl (10 microns particle size) | 2000 |
| Water | 400 |
| Ammonium acetate | 3.75 |
| Ammonium alginate | 4 |
| Ammonium hydroxide (29% by weight aqueous solution) | 13 |

Example II

| | |
|---|---|
| Tungsten powder (1.37 microns particle size) | 80 |
| De-ionized water | 20 |
| Ammonium alginate | 1.2 |
| Ammonium acetate | 1 |

Example III

| | Parts |
|---|---|
| Water | 400 |
| Iron carbonyl (10 microns particle size) | 960 |
| Iron powder (250 mesh) | 640 |
| Ammonium acetate | 20 |
| Ammonium alginate | 4 |

Example IV

| | |
|---|---|
| Water | 250 |
| Iron powder (250 mesh) | 750 |
| Ammonium acetate | 2.5 |
| Ammonium alginate | 2.5 |

Example V

| | |
|---|---|
| Water | 250 |
| Iron powder (250 mesh) | 750 |
| Sodium chloride | 2.5 |
| Ammonium alginate | 2.5 |

While the exact mechanism of the reaction involved on the addition of the salt to a slip is unknown, it is believed that since a slip has a colloidal component due to the presence of the suspending agent that the addition of a salt to the slip reduces swelling of the suspending agent making the slip less viscous and freeing water which may be more readily absorbed into the plaster mold, the increased absorption of water into the mold results of course in a shorter drying time.

The mechanism of the improvement resultant from coating the mold with a hydroxide is also unknown. However, the hydroxide appears to have the ability to prevent metal particles from reaching the face of the mold while still allowing water to penetrate the coating and be absorbed by the mold. This feature of the hydroxide coating results in easier removal of the article from the mold and the prevention of corrosion of both the coat article and the mold.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What I claim is:

1. In a slip casting process employing a slip casting composition consisting of a suspending agent selected from the group consisting of ammonium alginate, polyvinyl alcohol and gum arabic and a metal powder selected from the group consisting of iron, iron carbonyl and tungsten carried in an aqueous medium the steps of adding a water soluble salt selected from the group consisting of sodium chloride, potassium chloride and ammonium acetate in an amount equal to between ½ to 3% of the water weight to said slip casting composition.

2. A slip casting composition consisting essentially of a metal powder selected from the group consisting of iron, iron carbonyl and tungsten, a suspending agent selected from the group consisting of ammonium alginate, polyvinyl alcohol and gum arabic, water, and a water soluble salt selected from the group consisting of sodium chloride, potassium chloride and ammonium acetate in an amount equal to between ½ to 3% of the water weight.

3. A slip casting composition consisting essentially of a metal powder selected from the group consisting of iron, iron carbonyl and tungsten, a suspending agent selected from the group consisting of ammonium alginate, polyvinyl alcohol and gum arabic, water, and a water soluble salt present in amounts such that from 0.5% to 3% by weight of the total quantity of water present is salt selected from the group consisting of sodium chloride, potassium chloride and ammonium acetate.

4. A slip casting composition consisting essentially of a metal powder selected from the group consisting of iron, iron carbonyl and tungsten, a suspending agent selected from the group consisting of ammonium alginate, polyvinyl alcohol and gum arabic, water and a water soluble salt selected from the group consisting of sodium chloride, potassium chloride and ammonium acetate present in quantities such that about 1% of the total weight of water present is salt.

5. The slip casting composition of claim 2 wherein the pH is not less than 7.

References Cited by the Examiner
UNITED STATES PATENTS

| | | | |
|---|---|---|---|
| 1,585,010 | 5/26 | Bellamy | 264—86 |
| 2,406,428 | 8/46 | Luckhaupt | 106—287 |
| 2,413,098 | 12/46 | Benner et al. | 106—287 |
| 2,527,390 | 10/50 | Blaha | 264—86 |
| 2,811,408 | 10/57 | Braley | 18—47 |
| 2,851,330 | 9/58 | Taylor | 18—47 |
| 2,979,401 | 4/61 | Szymaszek | 264—86 |
| 2,990,292 | 6/61 | Rempes | 18—47 |
| 3,052,949 | 9/62 | Williams et al. | 264—86 |

MORRIS LIEBMAN, *Primary Examiner.*

UNITED STATES PATENT OFFICE
CERTIFICATE OF CORRECTION

Patent No. 3,216,841                                            November 9, 1965

Edward L. Thellmann

It is hereby certified that error appears in the above numbered patent requiring correction and that the said Letters Patent should read as corrected below.

Column 4, lines 23 and 24, strike out "selected from the group consisting of sodium chloride, potassium chloride and ammonium acetate" and insert the same after "salt" in line 21, same column 4.

Signed and sealed this 20th day of September 1966.

(SEAL)
Attest:

ERNEST W. SWIDER                                        EDWARD J. BRENNER
Attesting Officer                                              Commissioner of Patents